Dec. 29, 1964    L. A. LITSKY    3,162,930
METHOD OF MAKING ANTIFRICTION BEARINGS
Original Filed April 11, 1961
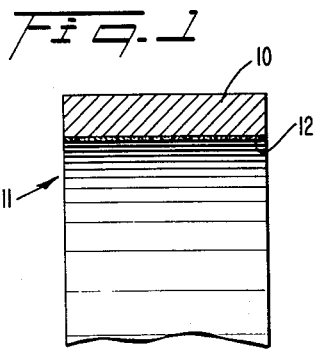
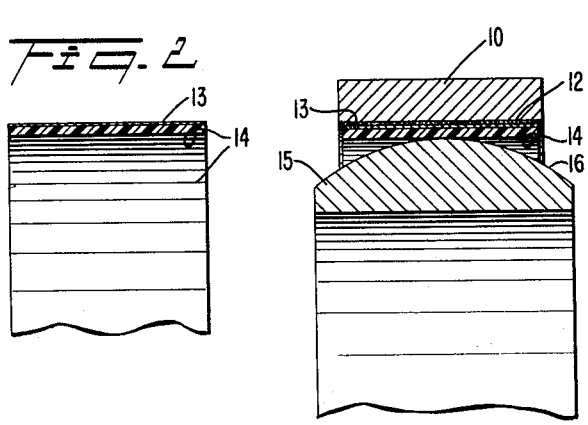
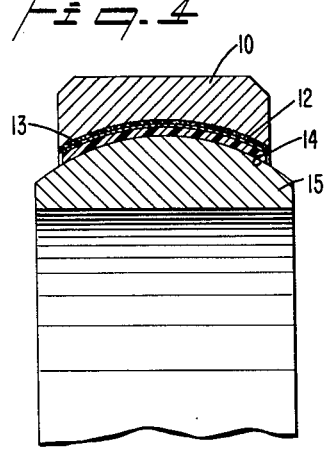
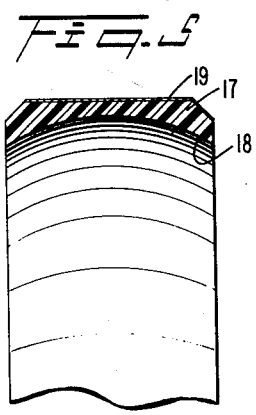
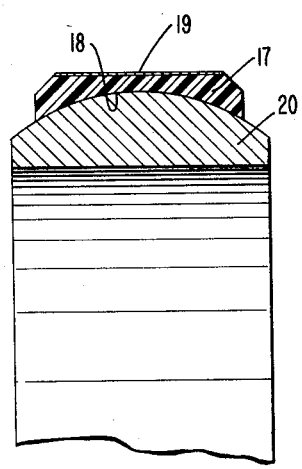
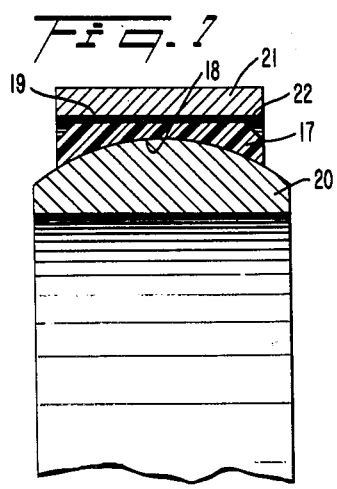
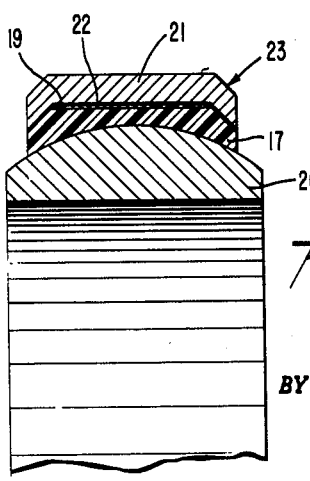
INVENTOR.
LEONARD A. LITSKY
BY
Hopgood & Calimafde
ATTORNEYS 3,162,930
METHOD OF MAKING ANTIFRICTION BEARINGS
Leonard A. Litsky, New Britain, Conn., assignor to The Fafnir Bearing Company, New Britain, Conn., a corporation of Connecticut
Original application Apr. 11, 1961, Ser. No. 102,230. Divided and this application Sept. 17, 1963, Ser. No. 309,513
3 Claims. (Cl. 29—149.5)

This application is a division of my copending application Serial No. 102,230, filed April 11, 1961, entitled Antifriction Bearings.

The present invention, generally, relates to anti-friction bearings and, more particularly, to a new and improved bearing and the method of manufacturing the same.

It is known in the manufacture of some forms of bearings such as self-aligning bearings, journal bearings, and the like, that an antifriction liner material may be bonded to the inner surface of an outer ring. It has been customary in the past to use a suitable adhesive material together with an application of both heat and pressure to accomplish the desired bonding of the liner material to the bearing ring.

The bearings described above have been entirely satisfactory in most instances, but it has been found that for some uses, an objectionable electrical potential is developed across the liner material between the inner and outer bearing rings. The electrical potential is not dissipated readily due to the dielectric characteristics of the essentially plastic composition of the liner material.

Accordingly, it is a principal object of the invention to provide a new and improved method for making a bearing which enjoys the advantages of an antifriction liner material but, at the same time, provides an electrically conductive path between the bearing rings.

It is also an object of the invention to provide a method of manufacturing a plastic-lined antifriction bearing which will not develop an electrical potential between bearing rings.

A further object of this invention is to provide a new and improved antifriction bearing uniquely adapted to withstand elevated temperature applications above the limitations of bearings heretofore known.

A still further object of the invention is to provide a new and improved antifriction bearing and method of manufacturing same to combine the desirable features of capability of operating at elevated temperatures and providing electrical grounding between bearing rings In one of its forms, the antifriction bearing of the invention includes an outer bearing ring to which is bonded a fabric liner material having a metallic thread woven adjacent one surface thereof and an electrical ground thread interleaving between both surfaces of the fabric. By the application of heat, for example, the metallic thread is bonded to the bearing race, and the grounding thread forms an electrical connection between bearing rings.

In most instances, it is preferred to apply a radially outward pressure on the liner concurrently with the elevated temperature. Of course, any desired means, such as a thermally expansible plug, may be used to develop the pressure.

Other objects of the invention will be pointed out in the following description and claims and illustrated in the accompanying drawings, which disclose by way of example, the principle of the invention and at least two methods which have been contemplated of applying that principle.

In the drawing:
FIG. 1 is a partial view in cross-section of an outer bearing ring;
FIG. 2 is a partial view in cross section of a liner material;
FIG. 3 shows the liner material of FIG. 2, bonded to the bearing rings of FIG. 1 and an inner bearing ring assembled therein;
FIG. 4 shows the assembly of FIG. 3 after the outer ring has been deformed and the assembly machined;
FIG. 5 shows a liner material which is preformed to fit a desired contour of a bearing ring;
FIG. 6 shows the preformed liner material of FIG. 5 assembled about an inner bearing ring;
FIG. 7 shows the assembly of FIG. 6 inserted within the bore of an outer bearing ring; and
FIG. 8 shows the assembly of FIG. 7 with the outer bearing ring deformed and the assembly machined.

Referring now to the antifriction bearing shown in FIG. 4 and to the FIGS. 1–4 illustrating the method of manufacturing same, an outer bearing ring 10 is coated on its inner surface 11 with a suitable low temperature material 12. One example of a suitable coating material is silver solder, which softens at approximately 640° F. and flows at 740° F.

While any suitable material may be used for the liner 17, the invention contemplates the use of a low friction fabric material with fibers having low frictional characteristics including the polyamide resins marketed under the name of "nylon," the polyester resins marketed under the Dupont trade name "Dacron," polyethylene, the polymeric fluorocarbon resins, including tetrafluoroethylene, marketed under the Dupont trade name "Teflon" and the monochloro-tetrafluoroethylene resins marketed under the trade name of "KEL-F" and "Flurothene." Of course, other materials are available, the above being merely illustrative and for the purposes of this description, the tetrafluoro-ethylene resins are preferred to the other resin fibers, since they withstand approximately 600° F. of temperature.

The low friction fabric material which is contemplated in the present invention also has a metallic thread woven therein in the fill to be used for thermal bonding. Preferably, this metallic thread is woven primarily adjacent the outer surface 13, as viewed in FIG. 2.

A second metallic thread is woven in the warp and interleaves the fabric between the outer surface 13 and the inner surface 14 to provide electrical conductivity between these surfaces. The amount of exposure at either surface of the fabric for this grounding thread can be controlled in the loom set up during weaving and in the type of fabric woven, as will be understood readily by one skilled in the art.

One method of assembling the bearing of the invention includes the step of positioning the liner of FIG. 2 within the bearing ring of FIG. 1 either by hand or by an air jig or fixture. Heat to approximately 740° F. is applied substantially simultaneously to the assembled liner and outer bearing ring by any suitable means such as, for example, by an induction coil wrapped around the outer ring 10 (not shown). This heat causes the low temperature silver solder 12 to flow around the metallic thread woven adjacent the surface 13 of the fabric, this high temperature not being applied long enough to damage the liner fabric.

It is preferred to apply pressure on the liner radially outwardly while the temperature is elevated, and this pressure may be obtained by any suitable means. For example, a plug or insert may be expanded mechanically, thermally, by fluid pressure or any other means.

After the application of heat as described above, the assembly is cooled quickly by, for example, running a cooling fluid through the induction coils or any other suitable means. As shown in FIG. 3 of the drawings, an inner bearing ring 15 having an outer, generally spherically contoured surface 16 is inserted within the outer ring 10, and the unit is ready for the deforming of the outer ring 10 as is customary in the manufacture of a self-aligning bearing. After deforming, machining and finishing, the completed bearing will appear as depicted in FIG. 4 of the drawings.

While the inner bearing ring 15 is indicated as being of a spherical type for a self-aligning bearing, it is understood that the invention is adaptable also to a journal type bearing, and the like.

The invention is adapted to a further modification in that the fabric liner material may be preformed or preshaped such as in a suitable mold to form its surfaces in a predetermined manner to fit a desired bearing member. For example, as illustrated in FIG. 5 of the drawings, a liner material 17 is shown pre-shaped so that its inner surface 18 is substantially spherical in contour and the outer surface 19 is substantially straight.

Of course, the molding of the shape illustrated in FIG. 5 may be accomplished by any desired means and may be done in two sections. For example, the preshaped liner 17 may be formed in sections split circumferentially or as hemispheres split axially, as desired.

The molded liner inserts preformed as described above then would be placed around the spherical surface of an inner ring 20, FIG. 6. For simplicity, the liner 17 is illustrated in the drawings as being all in one piece.

The assembled liner and inner ring FIG. 6 then is inserted, for example, by pressing into an outer ring 21, FIG. 7. A coating 22 of a suitable metallic, low temperature bonding material similar to the coating 12 of FIG. 1 lines the inner surface of the outer ring 21. Heat is applied and removed quickly as described previously above, thereby bonding the metallically threaded surface of the liner material 17 with the coating 22 on the outer ring 21. The generally spherical shape of the inner surface of the liner 17 holds the inner ring 20 in place during the bonding action.

Finally, after the bonding action, the outer ring 21 may be subjected to machining and finishing to present an appearance in cross-section as illustrated in FIG. 8. If desired, the corner 23 may be coined for added holding strength.

An additional step in the manufacture of the spherical bearing may be preformed to obtain a desired degree of looseness of the inner ring 20. Of course, the invention is not limited to any particular means for obtaining the looseness desired.

As explained previously, an antifriction bearing in accordance with the invention exhibits several advantages over the heretofore adhesive-bonded bearings. For example, a bearing constructed in accordance with the invention will withstand elevated temperatures up to the limit of the Teflon fabric, which is approximately 630° F. It should be noted that the 630° F. is well below the flow temperature of silver solder so that the bonding between the Teflon fabric and the outer bearing ring will not be affected adversely.

A second major advantage of a bearing constructed in accordance with the invention is the electrical ground provided by the grounding metallic thread which is woven in the warp being in electrical conductive relationship with the metallic bond and in position for contacting the inner bearing ring.

This thread is of an electrically conductive material such as copper, for example, and permits an electrical ground to be maintained between the shaft and the housing of an installation utilizing the bearing.

Obviously, many modifications and variations of the present invention are possible in the light of the above teachings. Therefore, it is to be understood that the invention is not limited in its uses to the details of construction and arrangement of parts specifically described or illustrated, and that within the scope of the appended claims, the invention may be practiced otherwise than as specifically described or illustrated.

What is claimed is:

1. A method of producing an antifriction bearing having an outer ring and an antifriction liner bonded therein, comprising the steps of coating the inner surface of said outer ring with a metallic material of relatively low melting temperature, placing the antifriction liner within the outer ring, heating the assembled ring and liner to a temperature sufficiently high to cause said metallic coating to flow and bond with the antifriction liner, removing said heat before damaging said antifriction liner, and assembling an inner ring within said liner and outer ring.

2. A method of producing an antifriction bearing having an outer ring and an antifriction fabric liner material with a metallic thread woven adjacent one surface thereof, comprising the steps of coating the inner surface of said outer bearing ring with a metallic material, placing the antifriction fabric liner material within the outer ring with the metallic thread surface adjacent the metallic coating on the outer ring, heating the assembled ring and liner to a temperature sufficiently high to cause the metallic coating to flow and bond with the metallic thread in the liner material, removing said heat before damaging the antifriction liner material, and assembling an inner ring within said liner and outer ring.

3. A method of producing an antifriction electrically grounded bearing having an outer ring and an antifriction plastic fabric liner material with a metallic thread woven adjacent one surface thereof and another metallic thread interwoven between both surfaces thereof, comprising the steps of coating the inner surface of the outer bearing ring with a metallic material having a relatively low flow temperature, placing the antifriction fabric liner material within the outer ring with the metallic bonding thread adjacent the metallic coating, heating the assembled ring and liner to a temperature sufficiently high to cause bonding of the metallic coating and the metallic thread while applying pressure radially outwardly against the liner, removing said heat before damaging the antifriction liner material, and assembling an inner bearing ring within the liner and outer ring so that the metallic thread woven between both surfaces of the fabric liner material electrically grounds the outer bearing ring with the inner bearing ring.

References Cited by the Examiner

UNITED STATES PATENTS

| | | | |
|---|---|---|---|
| 2,047,885 | 7/36 | Riebe | 308—72 |
| 2,350,398 | 6/44 | Hufferd | 287—85 |
| 3,085,312 | 4/63 | Evans | 29—149.5 |

FOREIGN PATENTS 731,348  6/55  Great Britain.

WHITMORE A. WILTZ, *Primary Examiner.*

THOMAS H. EAGER, JOHN F. CAMPBELL,
*Examiners.*